United States Patent
Suzuki et al.

(10) Patent No.: US 7,688,255 B2
(45) Date of Patent: Mar. 30, 2010

(54) ELECTRONIC SCANNING RADAR APPARATUS

(75) Inventors: Koichiro Suzuki, Tokyo (JP); Chiharu Yamano, Tokyo (JP); Gaku Takano, Tokyo (JP); Kazuma Natsume, Kariya (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/676,684

(22) Filed: Feb. 20, 2007

(65) Prior Publication Data

US 2008/0048906 A1 Feb. 28, 2008

(30) Foreign Application Priority Data

Feb. 27, 2006 (JP) .............................. 2006-050782

(51) Int. Cl.
G01S 13/34 (2006.01)
G01S 13/58 (2006.01)
G01S 13/00 (2006.01)

(52) U.S. Cl. ...................... 342/133; 342/104; 342/105; 342/118; 342/127; 342/128; 342/145; 342/146; 342/147; 342/158; 342/175; 342/195; 342/196

(58) Field of Classification Search ................ 342/118, 342/128–133, 89, 175, 147–158, 189, 197, 342/70–72, 74–81, 104, 105, 107–115, 145, 342/146, 101, 180, 27, 28, 127

See application file for complete search history.

(56) References Cited

U.S. PATENT DOCUMENTS

| | | | | |
|---|---|---|---|---|
| 5,345,470 A | * | 9/1994 | Alexander | 342/101 |
| 5,563,602 A | * | 10/1996 | Stove | 342/70 |
| 5,982,321 A | * | 11/1999 | Iihoshi et al. | 342/158 |
| 6,072,422 A | * | 6/2000 | Yamada | 342/70 |
| 6,085,151 A | * | 7/2000 | Farmer et al. | 342/70 |
| 2004/0201513 A1 | * | 10/2004 | Klausing et al. | 342/180 |
| 2005/0110675 A1 | * | 5/2005 | Gruener et al. | 342/128 |

FOREIGN PATENT DOCUMENTS

JP 2000-284044 10/2000

* cited by examiner

*Primary Examiner*—Bernarr E Gregory
(74) *Attorney, Agent, or Firm*—Law Offices of Robert F. Zielinski, LLC

(57) ABSTRACT

An electronic scanning radar apparatus has a cutting portion for cutting receiving data which is comprised of N numbers of data for each channel into two more short time data having M (<N) numbers of data in a time direction for each channel, an inverse matrix estimator for computing and estimating an inverse matrix of the time series correlation matrix from the short time data, and a phase information producing portion for computing CAPON phase information out of the estimated inverse matrix of the time series correlation matrix in order to detect a distance, an azimuth and a relative speed of a target on the basis of a computed CAPON phase information.

6 Claims, 8 Drawing Sheets

F I G. 7
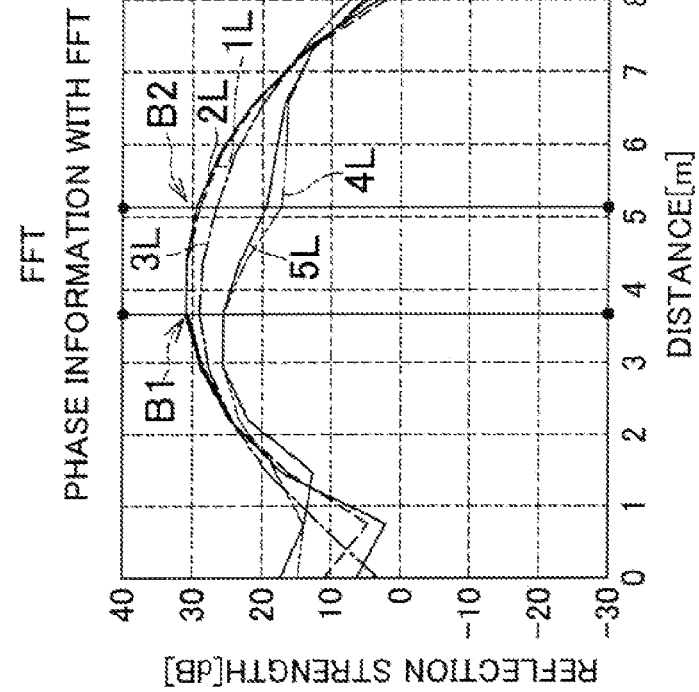
(a)
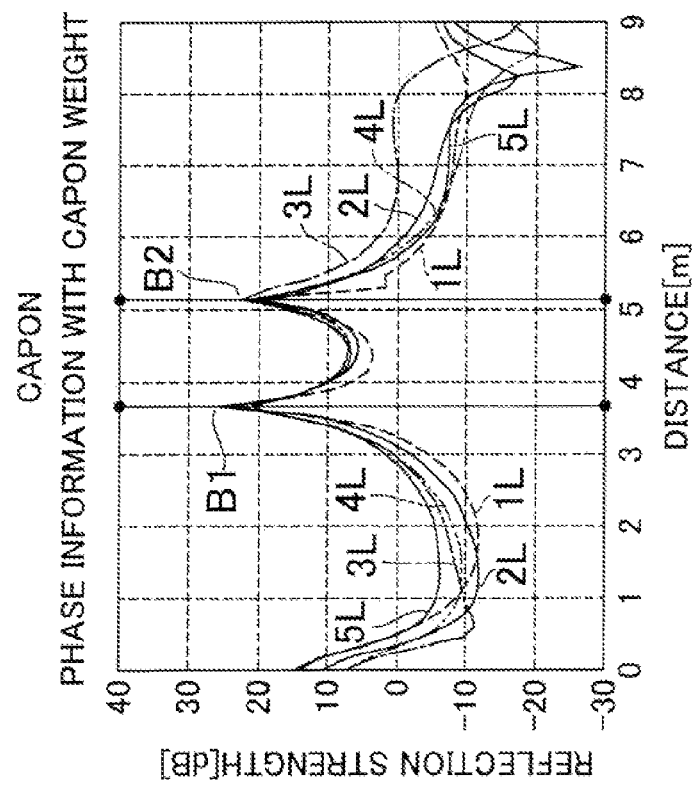
(b)

FIG. 8
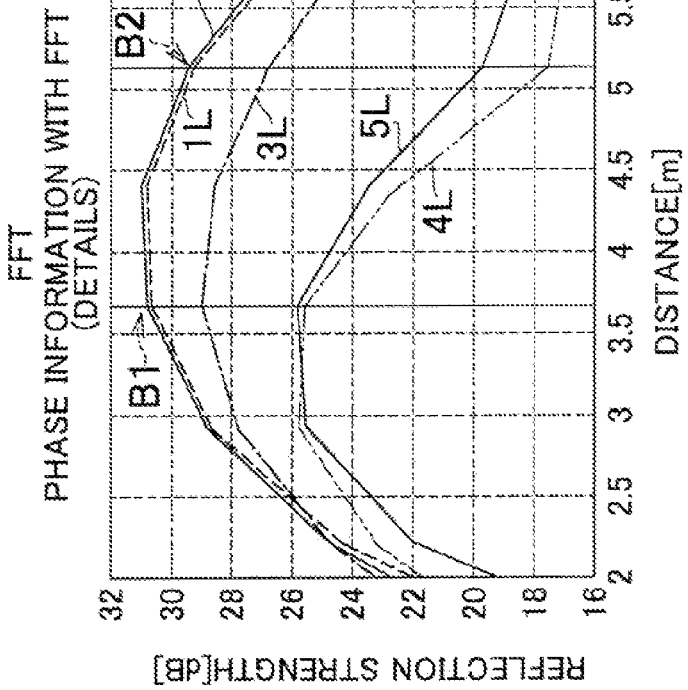
(b)
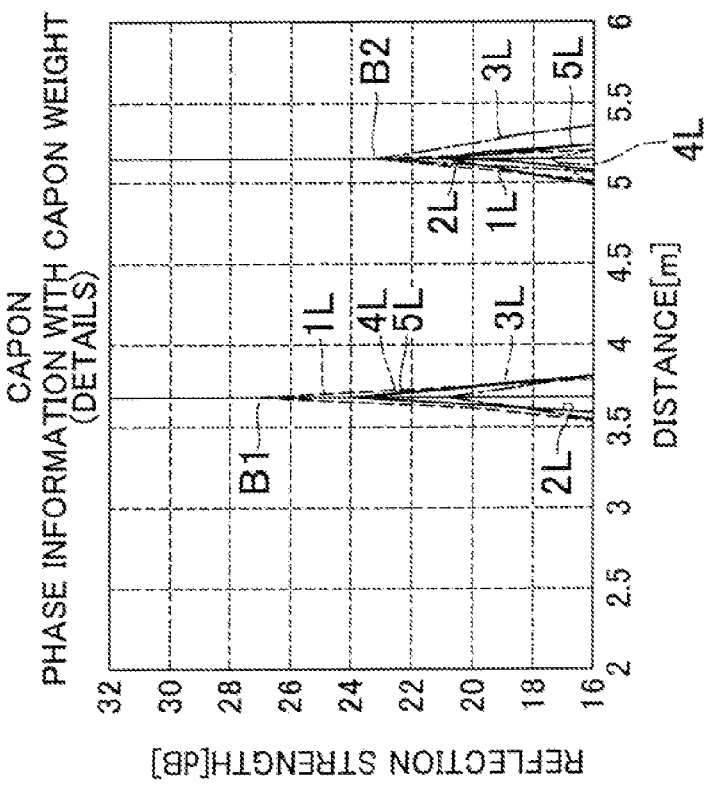
(a)

ered of N numbers, of data for
ELECTRONIC SCANNING RADAR APPARATUS

This application claims benefit of priority to Japanese Patent Application No. 2006-50782 filed on Feb. 27, 2006.

BACKGROUND OF THE INVENTION

This invention relates to an electronic scanning radar apparatus, and especially to a FM-CW type of electronic scanning radar apparatus for use on vehicle.

FIG. 1 is a time-chart showing transmitted signals and received signals and a principle of mixing in a FM-CW radar and FIG. 2 is a block diagram showing a conventional FM-CW type of electronic scanning radar apparatus.

On-vehicle radars for measuring distance, speed and azimuth with respect to a preceding target which exists in a forward direction have been developed in order to control an automotive vehicle crash prevention and tracking traveling.

A FM-CW radar system is used far measuring distance and relative speed with respect to a preceding target since this system has a simple structure of a signal processing circuit. As shown in FIG. 1, a signal S1 which frequency is linearly changed is transmitted from a transmission antenna in the FM-CW system. A signal S1 which is reflected by a target is received as a signal S2, and the received signal S2 and the transmitted signal S1 are mixed, with each other as shown in FIG. 1, thereby generating a beat signal S3 which component is a frequency difference between the received signal and the transmitted signal (beat frequency fb). This beat frequency is proportional to a reciprocating propagation delay time Δt from a target, and distance can be computed therefrom.

When measuring azimuth, an electronic scanning system for scanning all azimuths in a short time is employed. In the electronic scanning system, a reflected wave from a target is received by a plurality of antenna elements (array antenna) which are arranged according to some rule. And, a time difference occurs which is determined by the azimuth of the target to each antenna, a position where each antenna is arranged and the frequency of the received signal between channels of the received data. The azimuth of the target can be detected by this time difference (or difference of phases). As such kind of method, Digital Beamforming (DBF) is known. In DBF, the azimuth can be detected in such a manner that the received data is converted into digital data with an AD converter, and thereafter a correlation between each channel and vector data (array manifold vector) is taken (see document "Adaptive signal processing by array antenna" which has been published on 1998 by Kagaku Gijyutsu Shuppan written by Nobuo KIKUMA).

As mentioned before, data simultaneously received by a plurality of antenna elements are necessary in the electronic scanning system. But, in such a structure that the AD converter is prepared for each antenna element, the whole machine is made complex and expensive. Then, the structure as shown in FIG. 2 having a switcher 7 arranged between each antenna element 6 and an AD converter 13 in order to receive data, dividing time has been proposed.

Besides, phase information between the antennas is necessary in order to obtain the azimuth. In a conventional method, processing with FFT (Fast Fourier Transform) is executed by a FFT-type phase detector 15 as shown in FIG. 2 (see Japanese patent application publication number of which is 2000-284044).

Problems at the time of extracting phase information with FFT are as follows. Firstly, a weak reflected wave signal from a target is hidden from a strong reflected wave from, a target. Secondly, an accuracy of the phase information is uniquely determined by broadening of a main lobe of FFT, that is, by sampling frequency and number of sampling, and it is difficult to detect at such an accuracy depending on a distance to a target that distance accuracy has a priority in a short distance, and azimuth accuracy has a priority in a long distance. In order to obtain the phase information so as to give a priority to the distance accuracy in a short distance and give a priority to the azimuth accuracy in a long distance with FFT, it is necessary to change the sampling frequency and the number of sampling in a hardware, and a circuit structure is made complex, thereby.

Then, an object of the invention is to provide a n electronic scanning radar apparatus for extracting phase information at a high accuracy and for adjusting distance-azimuth resolution in order to solve the above-mentioned problems.

BRIEF DESCRIPTION OF THE DRAWINGS

FIG. 7 is a view for comparing distance resolution in producing and computing of phase information between a case (a) with CAPON and a case (b) with FFT.

FIG. 8 is a partially enlarged view showing an important part of FIG. 7.

SUMMARY OF THE INVENTION

Figure 1:
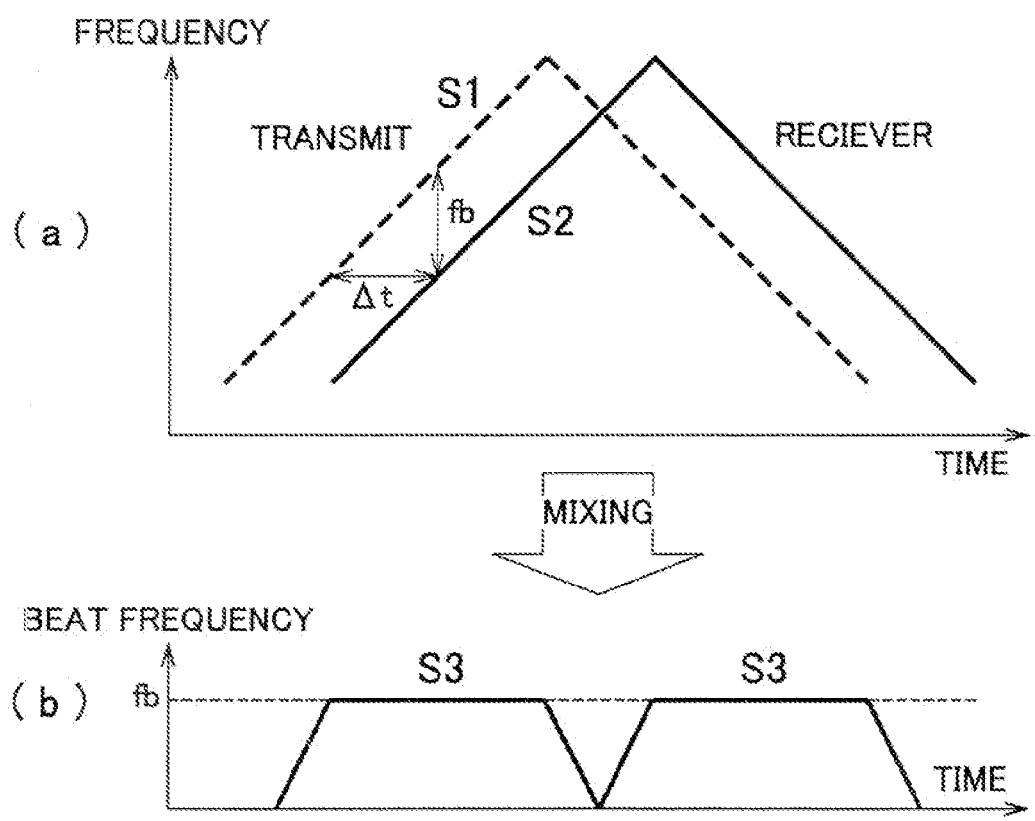
FIG. 1 is at time-chart showing transmitted signals and received signals in a FM-CW radar system and a principle of mixing thereof.
Figure 2:
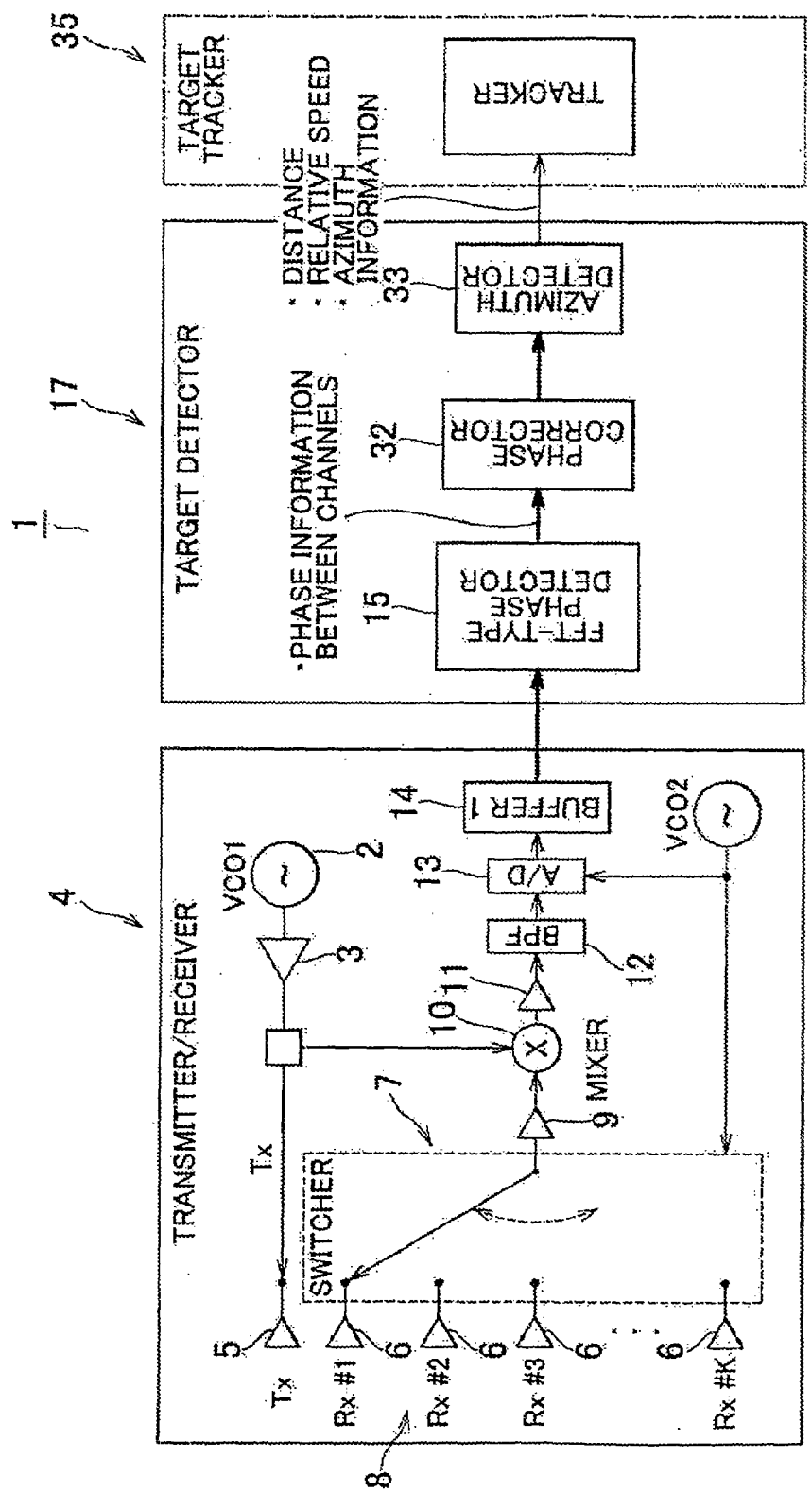
FIG. 2 is a block diagram showing a conventional FM-CW type of electronic scanning radar apparatus.

One aspect of the invention is electronic scanning radar apparatus, having a transmission antenna for ejecting a transmitted signal, which is obtained by executing frequency modulation on continuous wave;

a reception antenna which is comprised of two or more antenna components;

a mixer for mixing a received signal received by each of said two or more antennas and said, transmitted signal and for obtaining beat signals for two or more channels corresponding to said two or more antenna components;

a switcher provided between said mixer and said two or more antenna components, for selectively connecting said two or more antenna components with said mixer;

an A/D converter for sampling said, beat signal obtained by said mixer with a predetermined sampling frequency and for obtaining receiving data which is comprised of N numbers of data for each channel; and a target detector for detecting distance, azimuth and relative speed of a target on the basis of said receiving data for said two or more channels which has been sampled by said A/D converter, said electronic scanning radar apparatus, comprising:

a short time data cutting portion for cutting said receiving data which is comprised of N numbers, of data for each said channel into two or more short time data having M (<N) numbers of data in a time direction for each said channel;

a correlation matrix and inverse matrix estimator for obtaining a time series correlation matrix from said short time data cut out of said short time data cutting portion and for computing and estimating an inverse matrix of said time series correlation matrix; and a phase information producing portion with CAPON weight for computing CAPON phase information out of said estimated inverse matrix of said time series correlation matrix and said cut out short time data, whereby a distance, an azimuth and a relative speed of said target are detected on the basis of said computed CAPON phase information.

According to this aspect of the invention, two or more short time data, which is comprised of M numbers of data, number of which is small in a time direction, are cut out from the received data which are comprised of N numbers of data, and the inverse matrix of the correlation matrix is estimated from the thus cut short time data so as to compute the CAPON phase information, thereby computing the distance of a target and an azimuth thereof from the CAPON phase information. Then, targets B1 and B2 can be separated from each other in the distance component, making the best use of the characteristic of the CAPON, as shown in FIG. 7 and FIG. 8. In other words, it is possible to extract the phase information with high accuracy.

Another aspect of the invention is the electronic scanning radar apparatus, wherein said correlation matrix and inverse matrix estimator computes and estimates said inverse matrix of said time series correlation matrix by a successive processing of estimation of said inverse matrix with Recursive Least Squares.

According to this aspect of the invention, the inverse in matrix ($Rff^{-1}$) of the time series correlation matrix is computed and estimated by the successive processing of estimating of the inverse matrix with the RLS, so that the number of computation of the inverse matrix for which large amount of operations are necessary can be extremely decreased, thereby saving the operation cost and enlarging the data size.

Another aspect of the invention is the electronic scanning radar apparatus, wherein said snort time data cutting portion has cutting data varying means for varying data quantity to be cut out when cutting into said two or more short time data having M (<N) numbers of data in said time direction for each said channel.

According to this aspect of the invention, the cut data varying means can vary the data quantity to be cut out, so that the resolution can be properly switched between the distance resolution and the azimuth resolution, depending on the search object of the target to foe obtained, thereby carefully searching.

Another aspect of the invention is the electronic scanning radar apparatus, wherein said cutting data varying means has distance/azimuth switching means for setting large quantity of data as data to be cut out if high distance resolution is necessary and setting small quantity of data as data to be cut out if high azimuth resolution is necessary.

According to this aspect of the invention, the distance/ azimuth switching means can switch the resolution, laying stress on the distance or the azimuth according to a position of a target to be searched, and careful search is possible, thereby.

DESCRIPTION OF THE PREFERRED EMBODIMENTS

Embodiments of the invention will now be explained, referring to appended drawings.

Figure 3:
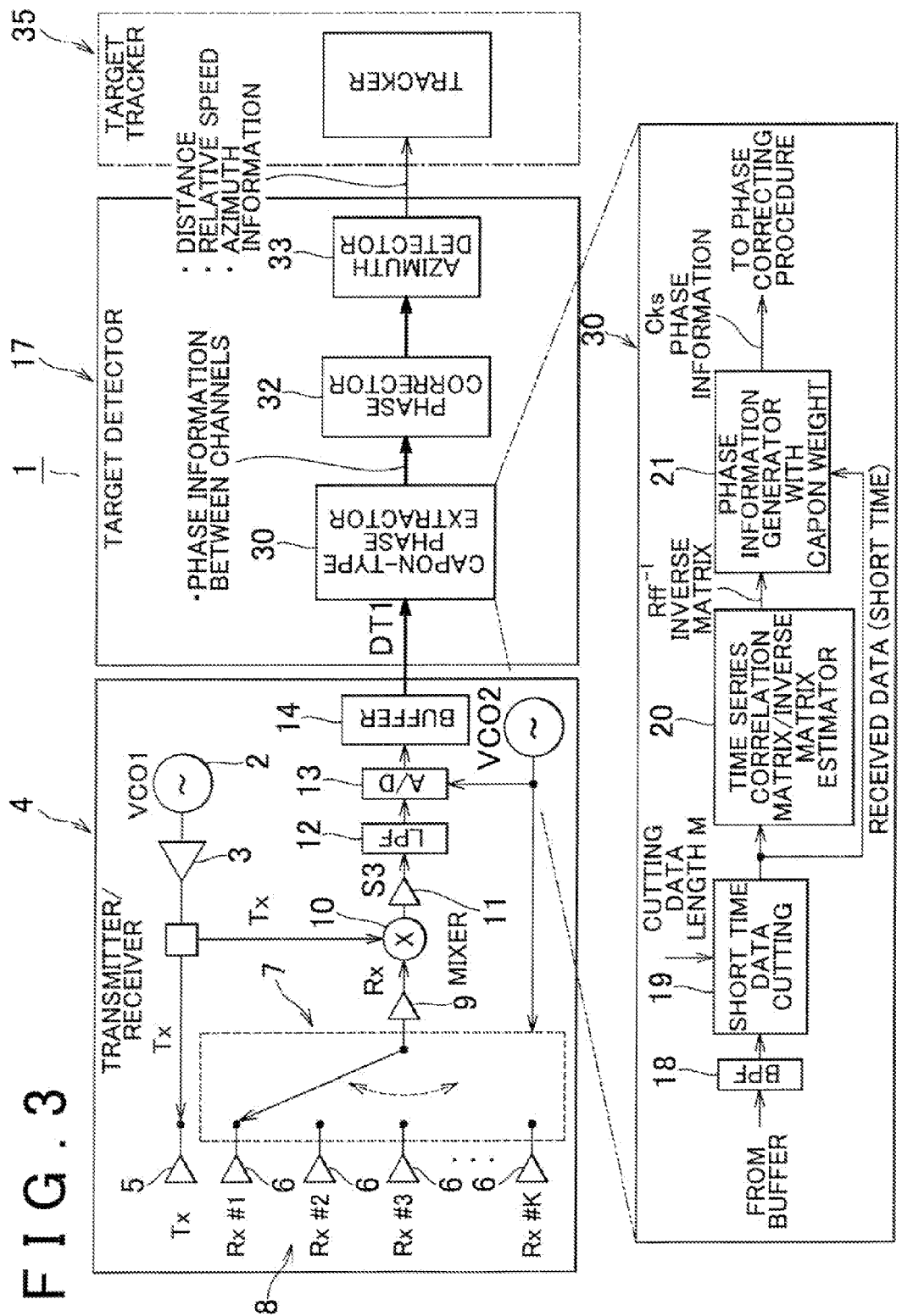
FIG. 3 is a block diagram showing an embodiment of an electronic scanning radar apparatus according to the invention.
Figure 4:
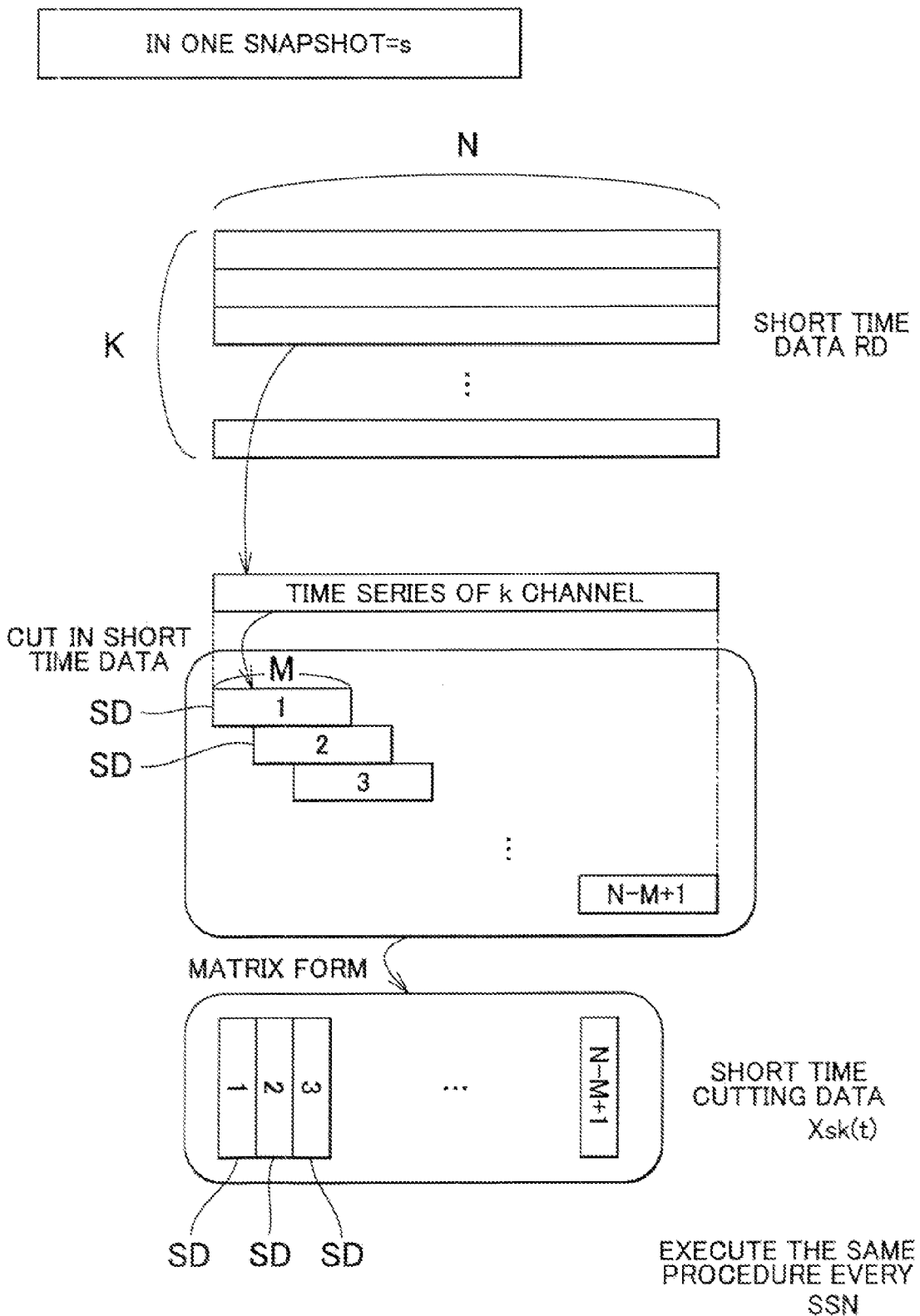
FIG. 4 is a typical view showing a processing of cutting short time data.
Figure 5:
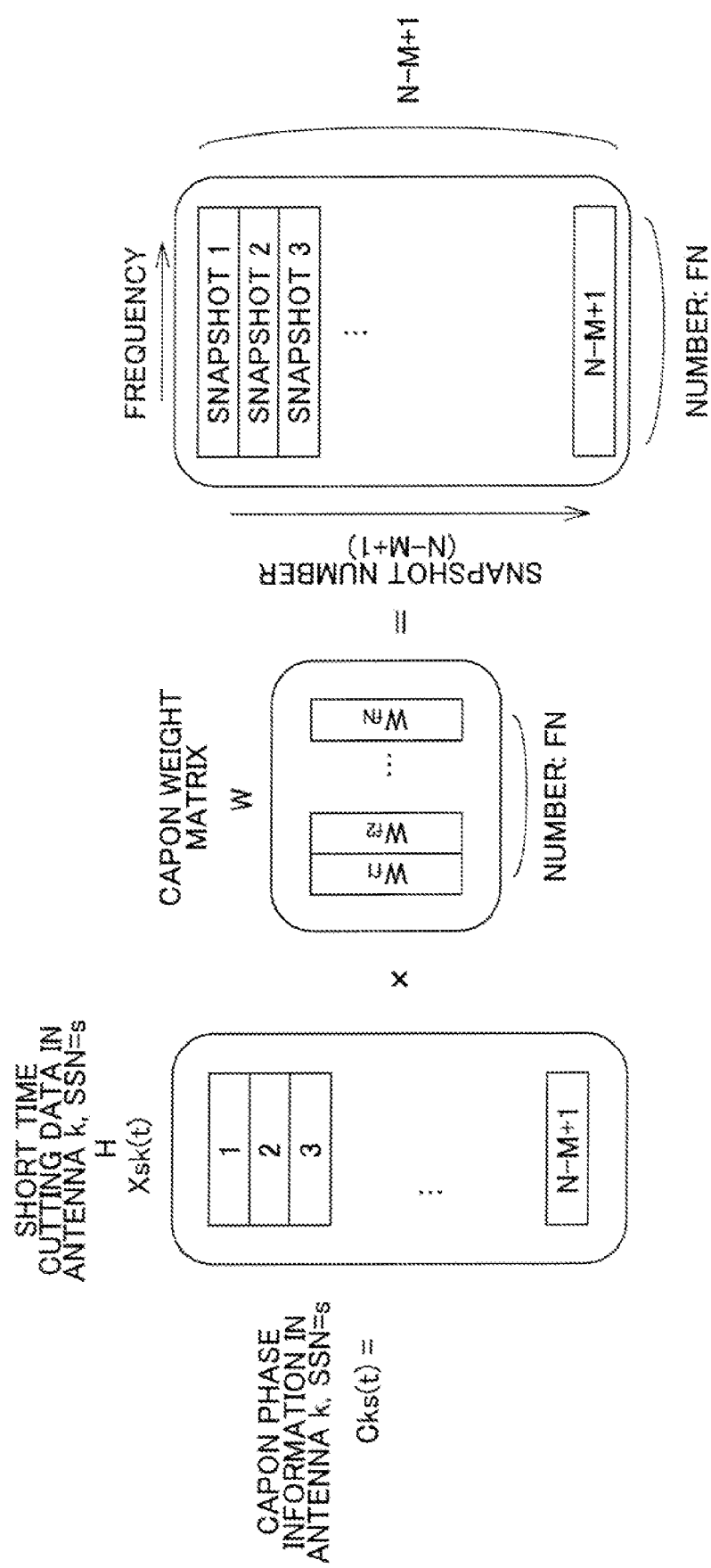
FIG. 5 is a typical view showing a processing of computing CAPON weight matrix.
Figure 6:
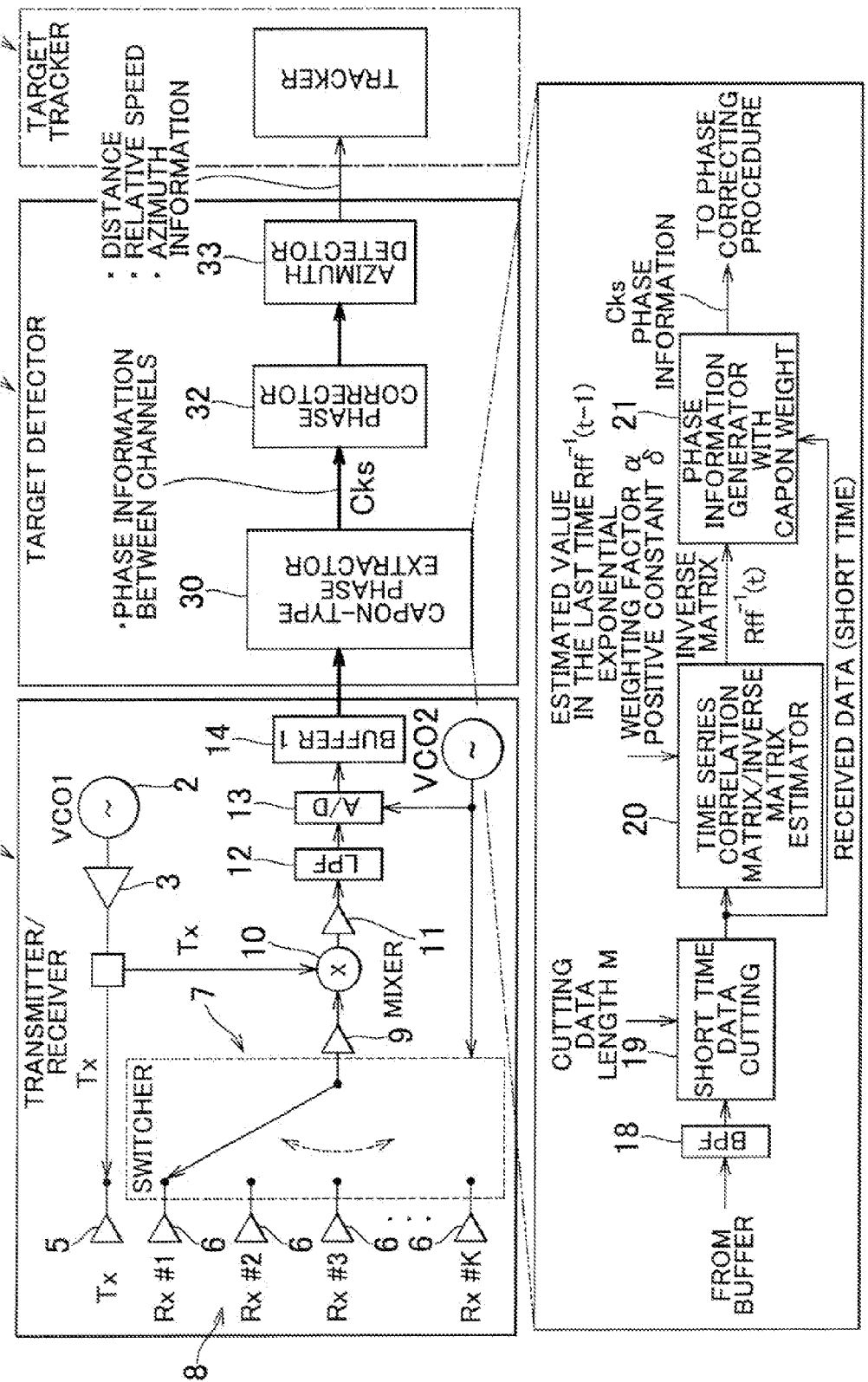
FIG. 6 is a block diagram showing the other embodiment of the electronic scanning radar apparatus according to the invention.

FIG. 3 is a block diagram showing an embodiment of an electronic scanning radar apparatus according to the invention, FIG. 4 is a typical view showing a processing of cutting short time data, FIG. 5 is a typical view showing a processing of computing CAPON weight matrix, FIG. 6 is a block diagram showing the other embodiment of the electronic scanning radar apparatus according to the invention, FIG. 7 is a view for comparing distance resolution in producing and computing of phase information between a case (a) with CAPON and a case (b) with FFT, and FIG. 8 is a partially enlarged view showing an import ant part of FIG. 7.

FIG. 3 is a block diagram showing an electronic scanning radar apparatus 1 which is an embodiment of the invention. This radar apparatus 1 is a FM-CW radar apparatus wherein a transmitted signal Tx which is obtained by executing frequency modulation (FM; on continuous wave (CW) is used. Ana, the radar apparatus is a DBF radar apparatus for executing Digital Beamforming processing in a reception array antenna 8. This radar apparatus 1 is a so-called on-vehicle radar apparatus which is provided on a vehicle, and detects a distance to a vehicle (target) traveling in a forward direction, and its relative speed. The result detected by the radar apparatus 1 is used for control information in a vehicle traveling. Microwaves are used as transmission waves.

This radar apparatus 1 has only one set of analogue device, such as a RF amplifier 9 and a mixer 10, in the whole structure by utilizing the switcher 7. The radar apparatus 1 has a transmitter/receiver 4, and the transmitter/receiver 4 has an oscillator 2 which center frequency is f0 (such as 76 Hz), an amplifier 3 and a transmission antenna 5. The oscillator 2 outputs a signal, which is obtained by multiplying a carrier wave of a frequency f0 by a triangular modulation of a frequency modulation width $\Delta F$, that is, a modulated wave (transmitted signal Tx) of a frequency $f0 \pm \Delta F/2$ by a control voltage which is outputted from a direct current for modulation (not shown). The modulated waves are amplified by the amplifier 3, and are emitted from the transmission antenna 5 as electromagnetic waves. A part of the transmitted signals Tx is outputted in the mixer 10 as local signals for detecting waves on reception side. The transmission antenna 5 is comprised of four element antennas, for instance, in order to have a desired directivity in a horizontal direction.

The reception array antenna 8 which is provided at the transmitter/receiver 4 has "K" number of array antenna components 6 which correspond to first channel (#1) through K-th channel (#K), the array antenna elements 6 being linearly arranged at equal intervals. Each antenna component 6 is comprised of two element antennas, and has a directivity which is fixed in a horizontal direction, similar to the transmission antenna 5. The switcher 7 has "K" numbers of input terminals and one output terminal, and each array antenna component 6 of the array antenna 8 is connected with each input terminal. The output terminal is connected with any one of the input terminals, and the connection is periodically switched by a switching signal (a clock signal). The connection is electrically switched on a circuit.

A received signal Rx is time divided and is multiplexed by the switcher 7 at a cycle of 1/fsw. Order of switching is random. If the reception antenna is comprised of the array antenna components 6 having five channels, which are arranged at equal intervals, for instance, the switching may not be in the arrangement order, starting from an edge, but 1ch→3ch→4ch→5ch→2ch. The time divided multiplexed signal is amplified by the RF amplifier 9, and the amplified and the transmittal signal Tx distributed by the mixer 10 are mixed with each other. The received signal Rx is down converted by this mixing, and the beat signal S3 which is a difference signal between the transmitted signal Tx and the received signal Rx is generated as shown in FIG. 1(b). The processing of obtaining the beat signal S3 on the basis of the received signal Rx and the transmitted signal Tx is a known art, which is disclosed in the Japanese patent application publication number of which is H11-133142, for instance. So, the details is omitted to foe explained in the specification.

In a FM-CW system with triangle wave modulation, the following expressions are satisfied $$fb1 = fr - fd \quad \text{[Expression 1]}$$

$$fb2 = fr + fd \quad \text{[Expression 2]}$$

where fr denotes beat frequency when relative speed is zero, fd denotes Doppler Frequency on the basis of relative speed, fb1 denotes beat frequency in a section where frequency increases (up section) and fb2 denotes beat frequency in a section where frequency decreases (down section).

If the beat frequencies fb1 and fb2 in the up section and the down section in the modulation cycle are separately measured, fr and fd can be obtained frost the following expressions (3) and (4), $$fr = (fb1 + fb2)/2 \quad \text{[Expression 3]}$$

$$fd = (fb2 - fb1)/2 \quad \text{[Expression 4]}$$

If fr and fd are obtained, distance R and speed V of a target can be obtained by the following expressions (5) and (6).

$$R = (C/(4 \cdot \Delta F \cdot fm)) \cdot fr \quad \text{[Expression 5]}$$

$$V = (C/(2 \cdot f0)) \cdot fd \quad \text{[Expression 6]}$$

where C denotes light speed and fm denotes FM modulation frequency.

The generated beat signal S3 is sampled and P quantized as N numbers of data with sampling frequency is by the A/D converter 13 via an amplifier 11 and a Low-Pass filter 12. The sampled and quantized is stored in a buffer 14 as "K (channels)×N×SSN (snapshot number)" numbers of received data DT1 as shown by Expression (7), and is outputted in a target detector 17.

[Expression 7]

$$X_s(t) = \begin{pmatrix} x_s(t)[1][1] & \cdots & x_s(t)[1][K] \\ \vdots & \ddots & \cdots \\ x_s(t)[K][1] & \cdots & x_s(t)[K][K] \end{pmatrix} \quad (7)$$

$$s = 1 \ldots SSN$$

The target detector 17 has a CAPON-type phase extractor 30, a phase corrector 32 and an azimuth detector 33, as shown in FIG. 3, and the CAPON-type phase extractor 30 has a Band-pass filter 18, a short time data cutting 19, at time series correlation matrix and inverse matrix estimator 20, and a phase information generator 21 with CAPON weight.

The Band-pass filter 18 cuts a frequency area to be a subject out of the received data DT1 received from the buffer 14 in the former step, the received date being comprised of many channels and two or more snapshots (snapshot number: SSN) and outputs the cut out in the short time data cutting 19. As shown in FIG. 4, the short time data cutting 19 cuts N numbers of receiving data RD stored in a time direction into M (<N) numbers of short data 3D in a time direction as shown in the following expression for each, channel corresponding to each array antenna element 6, and the cut out are converted into a matrix form so as to compute and produce the short time cutting data Xsk(t) for each channel. That is, the short time cutting data Xsk(t) is computed and produced for each channel (1 through K) from many channels outputted from the Band-pass filter 18 and the frequency area cutting data as shown in Expression 8.

[Expression 8]

$$X_{sk}(t) = \begin{pmatrix} x_s(t)[k][1] & \cdots & x_s(t)[k][p] & \cdots & x_s(t)[k][N-M+1] \\ x_s(t)[k][2] & \cdots & x_s(t)[k][p+1] & \cdots & x_s(t)[k][N-M+2] \\ \vdots & \ddots & \vdots & \ddots & \vdots \\ x_s(t)[k][M] & \cdots & x_s(t)[k][p+M-1] & \cdots & x_s(t)[k][N] \end{pmatrix} \quad (8)$$

$$k = 1 \ldots K$$
$$p = 1 \ldots N - M + 1$$

Subsequently, the time series correlation matrix and inverse matrix estimator 20 obtains a correlation P matrix (Rff) with the data Xsk(t) which has been cut out in a short time as shown by Expression (9).

[Expression 9]

$$R_{ff}(t) = \frac{1}{SSN \times K \times (N-M+1)} \sum_{s=1}^{SSN} \sum_{k=1}^{K} X_{sk}(t) X_{sk}^{H}(t) \quad (9)$$

where H denotes conjugate transpose.

An inverse matrix $R_{ff}^{-1}$ of the correlation matrix Rff is calculated and estimated from the obtained correlation matrix Rff.

After estimating and computing the inverse matrix $R_{ff}^{-1}$ of the correlation matrix Rff, the phase information generator 21 with CAPON weight obtains the phase information with CAPON weight from the data Xsk(t) cut out in a short time and the time series correlation inverse matrix as shown below.

That is, a Fourier transform vector $a_f$ of some frequency f is represented by Expression (10).

[Expression 10]

$$a_f = \begin{bmatrix} 1 \\ \vdots \\ \exp(2\pi \times i \times f \times T_s \times (k-1)) \\ \vdots \\ \exp(2\pi \times i \times f \times T_s \times (N-M)) \end{bmatrix} \quad (10)$$

where $T_s$ denotes sampling time (=1/Fs), (k=1, ... N−M+1).

CAPON weight $W_f(t)$ at time t with respect to the frequency f is shown in Expression (11) if the previously obtained inverse matrix of Rff is used.

[Expression 11]

$$w_f(t) = \frac{R_{ff}^{-1}(t) a_f}{a_f^H R_{ff}^{-1}(t) a_f} \quad (11)$$

If the frequency which is a subject for processing is [f1, . . . fn], a CAPON phase extracting matrix W is as follows.

[Expression 12]

$$W(t) = [w_{f1}(t), \ldots, w_{fn}(t)] \quad (12)$$

Then, CAPON phase information Cks in some antenna k is as follows,

[Expression 13]

$$C_{ks}(t) = X_{sk}^H(t) W(t) \quad (13)$$

Expression (13) is typically shown in FIG. 5.

Thus obtained CAPON phase information Cks is transmitted to the azimuth detector 33 in a latter step so as to detect the azimuth. As known from FIG. 5, "N−M+1" snapshot number of data is obtained out of one snapshot of one antenna. If an original snapshot number is SSN, "SSN×(N−M+1)" snapshot number of data can be obtained in the processing of obtaining CAPON-type phase information.

In the phase corrector 32 and the azimuth detector 33, a well-known processing is executed on the CAPON phase information cks which has been computed and extracted by the CAPON-type phase extractor 30 of the target detector 17, thereby computing the distance between one's own vehicle and a target, such as a precedent vehicle, the relative speed and the azimuth. Furthermore, a target tracker 35 of FIG. 3 executes operations, such as detecting of a precedent vehicle, by time tracking. The processing to be executed by the target tracker 35 is a known art, which is detailedly disclosed in the Japanese patent application publication number of which is 2003-270341, for instance. So, the details is omitted to be explained in the specification.

This embodiment is explained supposing that these processing portions and the operation contents thereof are actualized by a signal processing software to be operated through a micro processor or a digital signal processor. But, these processings can be actualized with an integrated circuit on a semiconductor device, such as FPGA and LSI.

As mentioned before, two or more short time data, which is comprised of M numbers of data, number of which is small in a time direction, are cut out of the received data RD which are comprised of N numbers of data, and the inverse matrix of the correlation matrix is estimated from the thus cut short time data Xsk so as to compute the CAPON phase information, thereby computing the distance of a target and an azimuth thereof from the CAPON phase information. Then, targets B1 and B2 can be separated from each other in the distance component, making the best use of the characteristic of the CAPON, as shown in FIG. 7 and FIG. 8. When a target is detected by the phase information with a conventional Fast Fourier Transform as shown in FIG. 7 and FIG. 8, the targets B1 and B2 overlaps with each other, so that it is impossible to separate the difference targets B1 and B 2 so as to be properly detected.

Besides, it is possible to improve a separation efficiency of targets in the distance component by cutting the short time data 3D, which are comprised of Larger number "M" of data, that is, the short time data SD having large quantity of data when detecting targets in a short distance area where a high distance resolution is needed. If a high azimuth resolution is needed, in other words, if targets are detected in a long distance area wherein the azimuth accuracy is more important than the distance accuracy, the short time data SD which is comprised of a smaller number "M" of data, that is, the data SD having small quantity of data may be cut out. By doing so, many snapshots can be used in the azimuth extracting processing, and the azimuth accuracy can be improved thereby.

The other embodiment of the electronic scanning radar apparatus according to the invention is shown in FIG. 6. In FIG. 6, the numerals the same as ones in FIG. 3 are used for the portions corresponding thereto, thereby omitting the explanation on the same portions. And, the structure excluding the CAPON-type phase extractor 30 of the radar apparatus is the same as one of FIG. 3.

A different point in the radar apparatus 1 of FIG. 6 from the embodiment of FIG. 3 is that to input an estimated value at a prior time, an exponential weighting factor α, and a positive constant δ in the time series correlation matrix and inverse matrix estimator 20. That is, the operation of obtaining the inverse matrix of the correlation matrix Rff in the time series correlation matrix and inverse matrix estimator 20 is replaced by successive processing of estimating the inverse matrix with RLS (Recursive Least Squares) as shown in Expression (14) (see reference "Adaptive Antenna Technique" written by KIKUMA.

[Expression 14]

$$\begin{cases} R_{ff}^{-1}(0) = \delta^{-1} I \\ R_{ff}^{-1}(t) = \frac{1}{\alpha} R_{ff}^{-1}(t-1) - \dfrac{\sum_{s=1}^{SSN} \sum_{k=1}^{K} R_{ff}^{-1}(t-1) X_{sk} X_{sk}^H R_{ff}^{-1}(t-1)}{\alpha^2 + \alpha \sum_{s=1}^{SSN} \sum_{k=1}^{K} X_{sk}^H R_{ff}^{-1}(t-1) X_{sk}} \end{cases} \quad (14)$$

where δ denotes a positive constant and α denotes an exponential weighting factor (0<α<1).

In general, the operation of an inverse matrix is expensive, and regular matrices are necessary therefor. For these reasons, it is necessary to restrict the data size of the short time cut data Xsk(t) to (N−M+1)×SSN or less. Then, the time series correlation matrix and inverse matrix estimator is replaced by the successive processing of estimating the inverse matrix with RLS, and then, the operation result of the inverse matrix at the time just before can be used, as shown in Expression 14, thereby saving the operation cost and enlarging the data size.

The invention can be utilized for a FM-CW type of electronic scanning radar apparatus for use on vehicle.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. Electronic scanning radar apparatus comprising:
   means for producing a continuous wave;
   frequency modulation means for producing a transmission signal by modulating said continuous wave produced by said means for producing a continuous wave with FM modulation;
   a transmission antenna for outputting said transmission signal;
   a reception antenna which is comprised of two or more antenna components;
   a mixer for mixing a received signal received by each of said two or more antenna components and said transmission signal and for obtaining beat signals for two or more channels corresponding to said two or more antenna components;

a switcher provided between said mixers and said two or more antenna components, for selectively connecting said two or more antenna components with said mixer;

an A/D converter for sampling said beat signal obtained by said mixer with a predetermined sampling frequency and for obtaining receiving data which is comprised of N numbers of data for each channel;

a data taker for taking two or more time data which is comprised of M number of data in a time direction in each channel from said receiving data which is comprised of N numbers of data in each said channel obtained by said A/D converter, said M number being smaller than said N number;

a correlation matrix and inverse matrix estimator for obtaining a time series correlation matrix from said time data which is taken by said data taker and for estimating an inverse matrix of said time series correlation matrix;

a phase information producing portion with CAPON weight for computing CAPON phase information out of said estimated inverse matrix of said time series correlation matrix and said taken time data; and a detector for detecting a distance, an azimuth and a relative speed of said target on the basis of said CAPON phase information which is computed by said phase information producing portion.

2. The electronic scanning radar apparatus according to claim 1, wherein said correlation matrix and inverse matrix estimator estimates said inverse matrix of said time series correlation matrix by a successive processing of estimation of said inverse matrix with Recursive Least Squares.

3. The electronic scanning radar apparatus according to claim 2, wherein said data taker has taken data varying means for varying data quantity which comprises said time data when said data taker takes two or more time data which is comprised of said M number of data which is smaller than said N number of data in said time direction in each said channel.

4. The electronic scanning radar apparatus according to claim 3, wherein said taken data varying means has distance/azimuth switching means for setting larger quantity of data which comprises said time data in comparison with a case where higher azimuth resolution is necessary in comparison with said distance resolution when higher distance resolution is necessary in comparison with said azimuth resolution.

5. The electronic scanning radar apparatus according to claim 1, wherein said data taker has taken data varying means for varying data quantity which comprises said time data when said data taker takes two or more time data which is comprised of said M number of data which is smaller than said N number of data in said time direction in each said channel.

6. The electronic scanning radar apparatus according to claim 5, wherein said taken data varying means has distance/azimuth switching means for setting larger quantity of data which comprises said time data in comparison with a case where higher azimuth resolution is necessary in comparison with said distance resolution when higher distance resolution is necessary in comparison with said azimuth resolution.

* * * * *